United States Patent
Dedieu et al.

[15] 3,681,437
[45] Aug. 1, 1972

[54] CITRATES OF 5-(Z-DIMETHYLAMINOETHOXY)CARVACROL ACETATE

[72] Inventors: Guy Dedieu, 72 Rue du Palais Gallien, 33 Bordeaux; Claude Defour, 27 Rue Delabordere, 92 Neuilly SuSeine, both of France

[22] Filed: Aug. 12, 1968

[21] Appl. No.: 751,761

[52] U.S. Cl. ............................. 260/479 R, 424/311
[51] Int. Cl. ........................................... C07c 93/26
[58] Field of Search ................... 260/479, 501.17

[56] References Cited

UNITED STATES PATENTS 3,262,946   7/1966   Moffett ................... 260/501.17

*Primary Examiner*—James A. Patten
*Attorney*—Craig, Antonelli, Stewart & Hill

[57] ABSTRACT

The di-, mono- and neutral citrates of 2-acetyl-5-ethoxydimethylamino carvacrol and their use in therapy. In particular, the diacid citrate of 2-acetyl-5-ethoxydimethylamino carvacrol has properties which make it possible to treat local disorders caused by excesses of adrenaline. The compounds are especially useful when formulated as ointments or pomades.

2 Claims, No Drawings

CITRATES OF 5-(2-DIMETHYLAMINOETHOXY)CARVACROL ACETATE

This invention relates to novel compounds which counteract the action of adrenaline. More particularly, it relates to the preparation and therapeutic use of new compounds for treating the local disorders caused by excesses of adrenaline. Even more particularly, the invention relates to the diacid citrate of 2-acetyl-5-ethoxydimethylamino carvacrol and pharmaceutical preparations containing the same.

The pharmaceutical industry is constantly striving to find and develop new compounds having therapeutic activity and much research has been devoted to this objective in recent years. Although compounds are discovered which display advantageous therapeutic properties, the problem still remains as to the safety and efficacy thereof for various disorders. Moreover, it is a requirement that a compound having advantageous properties must be administrable in a pharmaceutically acceptable manner in order to be useful as a therapeutic tool. The compositions of the present invention possess these desired advantages of possessing therapeutic properties while being pharmaceutically acceptable for widespread use.

One of the objects of the present invention is to provide novel compounds and pharmaceutical compositions comprising the same which make it possible to treat local disorders caused by excesses of adrenaline in a particularly efficacious manner.

Another object of the present invention is to provide a process for preparing said compounds.

A further object of the invention is to provide therapeutic compounds which lend themselves particularly well to pharmaceutical formulations, such as pomades and ointments.

A still further object of the invention is to provide compounds having anti-adrenaline properties.

These and other objects and advantages of the present invention will become apparent to those skilled in the art from a consideration of the following specification and claims.

In accordance with the present invention, it has been found that the compounds resulting from the reaction of 2-acetyl-5-ethoxydimethylamino carvacrol with citric acid in the proportion of one, two or three molecules of base per one molecule of citric acid possess the properties and fulfill the objectives noted above. The structural formula of 2-acetyl-5-ethoxydimethylamino carvacrol is given by the following formula:

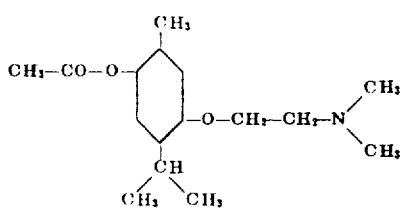

The resultant compounds have the form of a crystallized powder, are soluble in water and have a good stability.

The compounds of the invention are readily prepared by reacting the amino base in a suitable molecular ratio with citric acid in an appropriate inert solvent. Solvents which may be employed include alkanols such as, for example, ethanol.

The following example of the preparation of the diacid citrate derivative of carvacrol is given merely as illustrative of the present invention and is not to be considered as limiting.

EXAMPLE 1

Preparation of the diacid citrate of 2-acetyl-5-ethoxydimethylamino carvacrol 150 cm³ of alcohol and 9.6 grams of citric acid (0.05 mol) are introduced into a reaction apparatus equipped with a reflux cooler and a mechanical stirring means. Heat is supplied in order to dissolve the contents, and 14 grams of 2-acetyl-5-ethoxydimethylamino carvacrol (0.05 mol) is then added all at once. The hot mixture is filtered and then allowed to crystallize by cooling. The mixture is centrifuged, washed with a small amount of alcohol and dried in an oven at around 50° C. The diacid citrate of 2-acetyl-5-ethoxydimethylamino carvacrol is thereby obtained in a very good yield (80 – 90 percent of the theoretical) in the form of brilliant white platelets which are soluble in water, insoluble in cold alcohol and which melt at 166° – 168 °C.

The pH of a 5 percent aqueous solution thereof lies between 3.5 and 4.2. The determination of the base by anhydrotitrimetry gives a figure of 58.9, as compared to a calculated value of 59.23. The content of citric acid found is 40.1, as compared to a theoretical value of 40.76. The spectrophotometric determination of the base, which displays an absorption maximum at 275 $\mu$, makes it possible to confirm the structure of the new derivative prepared in the described manner.

The products according to the present invention, and more particularly the diacid citrate of 2-acetyl-5-ethoxydimethylamino carvacrol, by reason of the pH value of its aqueous solution, lend themselves particularly well to the preparation of pharmaceutical agents which are designed for local application, such as pomades, ointments, creams, etc. The diacid citrate of 2-acetyl-5-ethoxydimethylamino carvacrol has, in fact, the advantage of not exerting an irritating action on the skin and of penetrating therein particularly readily.

The preparation of a pomade with the use of the compounds according to the present invention is indicated hereinbelow by way of example, yet the particulars which are set forth with respect to the technique of the pharmaceutical preparation should not be construed as having a limitative character.

EXAMPLE 2

Pomade comprising the diacid citrate of 2-acetyl-5-ethoxydimethylamino carvacrol An emulsified pomade having a continuous aqueous phase is prepared by dissolving 3 grams of the diacid citrate of 2-acetyl-5-ethoxydimethylamino carvacrol in 64.9 parts of water mixed with 5 parts of a fungicide. This solution is added to a previously molten mixture of an ethylene oxide condensate, such as Tefose and Labrafil, and vaseline oil (q.s. 100 percent pure) and is emulsified by cooling. An unctuous preparation having a pH of 4.1 is thus obtained.

Pharmacological experiments have been conducted to show the adrenaline-counteracting effect of the preparations of the present invention. Exemplary thereof is the following procedure.

At the beginning of the experiment, the sides of a batch of 10 guinea pigs are depilated. The following day, the batch is divided into two groups. Five animals are treated with 1 gram of pomade prepared according to Example 2. Then, the 10 guinea pigs each receive an intradermal injection of 500 micrograms of adrenaline into each side. At the end of 5 days, it is found that the previously treated animals have survived without shock;

two of the non-treated animals have died after a violent shock, and the three remaining animals have deep ulcerations of the skin.

The products according to the present invention have further displayed a particularly interesting activity for the treatment of local disorders due to an excess of adrenaline, thus making it possible to obtain a particularly well tolerated medication therewith.

Generally, the posology to be followed for an adult with the preparations of the present invention varies from one to several grams per day of the active principle being administered in the form of the pomade according to Example 2, in dependence upon the extent or severity of the lesions to be treated. The exact posology depends, of course, upon the particular circumstances of the case.

While the specific Examples hereinabove have illustrated the preparation of the diacid citrate of 2-acetyl-5-ethoxydimethylamino carvacrol, it is to be understood that the mono- and neutral citrate derivatives thereof can be prepared in an analogous manner by suitably varying the molecular proportion of reactants employed. The resultant compounds also display the advantageous therapeutic properties discussed above.

The invention being thus described, it will be obvious that the same may be varied in many ways. Such variations are not to be regarded as a departure from the spirit and scope of the invention, and all such modifications are intended to be included within the scope of the following claims.

We claim:

1. A compound selected from the group consisting of the di-, mono- and neutral citrates of the compound having the following structural formula:

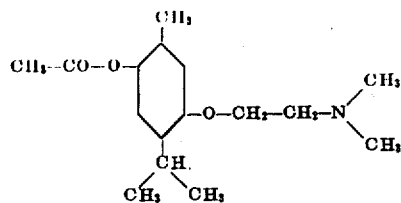

2. The diacid citrate of the compound having the following structural formula:

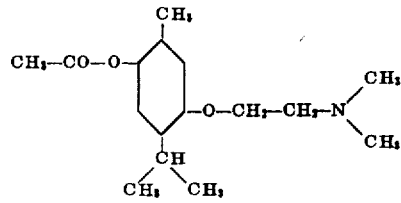

* * * * *